Figure 1:
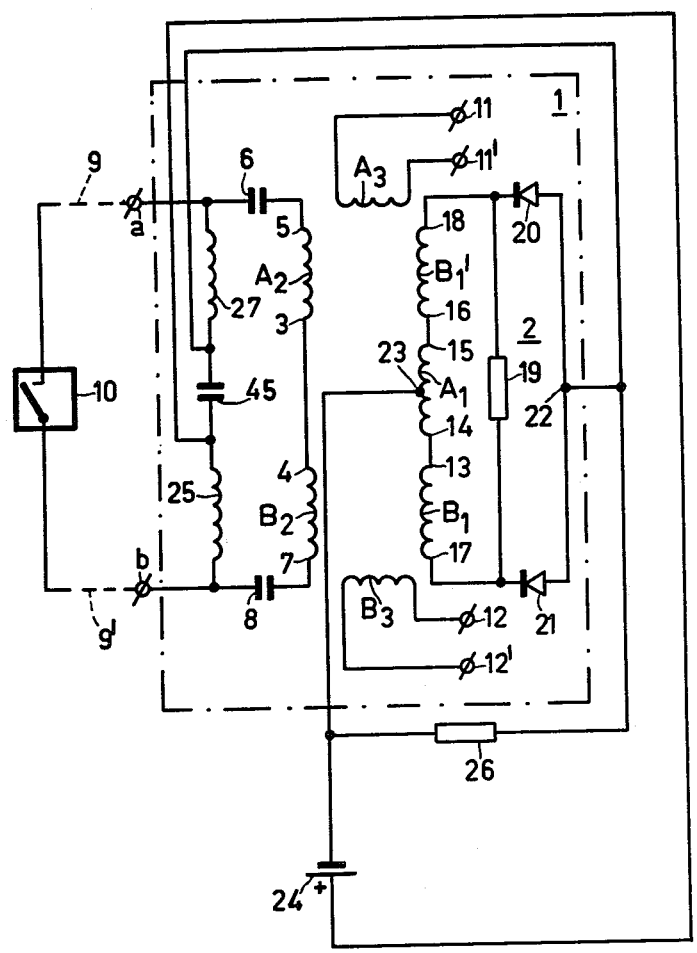

United States Patent

Buchner

[11] 4,297,536
[45] Oct. 27, 1981

[54] SELF-ADJUSTING HYBRID NETWORK

[75] Inventor: Robert B. Buchner, Bussum, Netherlands

[73] Assignee: U.S. Philips Corporation, New York, N.Y.

[21] Appl. No.: 38,377

[22] Filed: May 11, 1979

[30] Foreign Application Priority Data

May 19, 1978 [NL] Netherlands ............. 7805416

[51] Int. Cl.³ .............................................. H04B 1/58
[52] U.S. Cl. ............................................... 179/170 D
[58] Field of Search ....... 179/170 R, 170 D, 170 NC, 179/170 T

[56] References Cited

U.S. PATENT DOCUMENTS

| 2,302,374 | 11/1942 | Mitchell | 179/170 D |
| 3,178,521 | 4/1965 | Brown | 179/170 D |
| 3,855,430 | 12/1974 | Colardelle et al. | 179/170 NC |
| 3,875,350 | 4/1975 | Fischer | 179/170 D |
| 4,096,362 | 6/1978 | Crawford | 179/170 D |
| 4,103,118 | 7/1978 | Bergman | 179/170 D |
| 4,150,260 | 4/1979 | Kamata | 179/170 D |
| 4,178,569 | 12/1979 | Reutter et al. | 179/170 D |

Primary Examiner—Bernard Konick
Assistant Examiner—Randall P. Myers
Attorney, Agent, or Firm—Thomas A. Briody; William J. Streeter; Laurence A. Wright

[57] ABSTRACT

The balancing network is disclosed for use in a circuit for connecting a two-wire subscriber's line to a four-wire transmission line which automatically matches the impedance of the subscriber's line by utilizing the direct current flowing in the subscriber's line.

6 Claims, 2 Drawing Figures

SELF-ADJUSTING HYBRID NETWORK

The invention relates to a hybrid network for connecting a two-wire line to a four-wire circuit, comprising a pair of connecting terminals for connecting a subscriber's line fed by a d.c. supply source.

A hybrid network for coupling a two-wire subscriber's line to a four-wire line, consisting of a two-wire transmit line and a two-wire receive line is generally known. Such a hybrid network comprises a balancing network whose function is to prevent cross-talk between the receive line and the transmit line. To accomplish this object the impedance of the balancing network is adjusted so that it has a fixed value which approximately corresponds to the value of the impedance of the subscriber's line.

One difficulty encountered in practice is that the impedance of a subscriber's line depends on a number of factors. If the subscriber's line is coupled to a given hybrid network, the line condition (open/closed loop) will greatly influence the line impedance. Also, if the hybrid network is used to serve a plurality of subscriber's lines the impedances of the subscriber's lines will be mutually different, inter alia due to their different lengths.

It is an object of the invention to provide a hybrid network of the type specified in the first paragraph which obviates the above-mentioned difficulties by automatically adjusting the impedance of the balancing network in a simple manner to a value corresponding to the value of the impedance of any subscriber's line connected thereto.

The hybrid network according to the invention comprises an adjustable balancing network which is provided with (a) control input(s) coupled to said terminal(s) for adjusting, the subscriber's line being connected, the balancing network, depending on the direct current which flows through said terminals and is supplied by the source.

A self-adjusting hybrid network is known per se from U.S. Pat. No. 2,302,374. In this patent the balancing network is adjusted on the basis of the a.c. (speech) signals. As a consequence the required circuits become bulky and complicated.

The advantage of a network according to the invention is that the circuit for producing the signal used for adjusting the balancing network as well as the balancing network itself, may be easily implemented and consist of a relatively small number of components.

In a further embodiment according to the invention, the control inputs of the balancing network are coupled via chokes to the connecting terminals of the subscriber's line. This arrangement prevents the direct current adjustment of the balancing network from affecting the a.c. (speech) signals flowing in the subscriber's line, and vice versa.

A simple adjustment of the balancing network is achieved if, in accordance with a further embodiment of the invention, use is made of the differential resistance of a semi-conductor junction which is adjusted by a direct current which is proportional to the direct current flowing in the subscriber's line and originating from the d.c. supply source.

A further embodiment of a hybrid network in accordance with the invention comprising transformers for connecting the two-wire and the four-wire subscriber's line and comprising a winding connected to the balancing network is characterized in that a first control input of the balancing network is coupled via a first semi-conductor junction to a first end of the said winding and via a second semi-conductor junction to a second end of the winding and in that a center tap of the winding is coupled to the d.c. supply source. Owing to the symmetry of the balancing network and of the windings coupled thereto, the direct current is split into two portions and flows in the opposite sense through the two halves of the windings of the transformers to which the balancing network is connected. The advantage of this construction is that the cores of the transformers are not magnetised by the direct current through the balancing network. A further advantage of the symmetry is that the voltage difference across the two halves of the windings is equal for direct current, which implies that there will be no voltage difference, at least for direct current, between the ends of the windings. Thus, a fixed value impedance which is connected between these two ends will not affect the direct current setting of the balancing network. If the hybrid network according to the invention is permanently coupled to a particular subscriber's line and has for its purpose to adjust the balance for the open and for the closed loop conditions, whatever the case may be, then, in the case of an open loop, the balance impedance is only constituted by the fixed value impedance connected to the winding, while in the case of a closed loop the adjustment of the balancing network is not affected by the fixed value impedance arranged in parallel with the winding. The advantage thereof is that it is possible to choose the impedance for the open loop condition independently of the balance impedance for the closed loop condition.

The use of a semi-conductor junction implies that the polarity of the direct current, supplied by the source, has a fixed value for the adjustment of the semi-conductor junction. A further embodiment of a network according to the invention is therefore characterized in that means are provided which are coupled to the connecting terminal(s) of the subscriber's line and the control input(s) of the balancing network for changing the polarity of the direct current of the d.c. supply source. One advantage of this embodiment is that the impedance of the balancing network is adjusted by a direct current of a fixed polarity, whereas the polarity of the direct current flowing in the subscriber's line and supplied by the same d.c. source can be altered.

Figure 2:
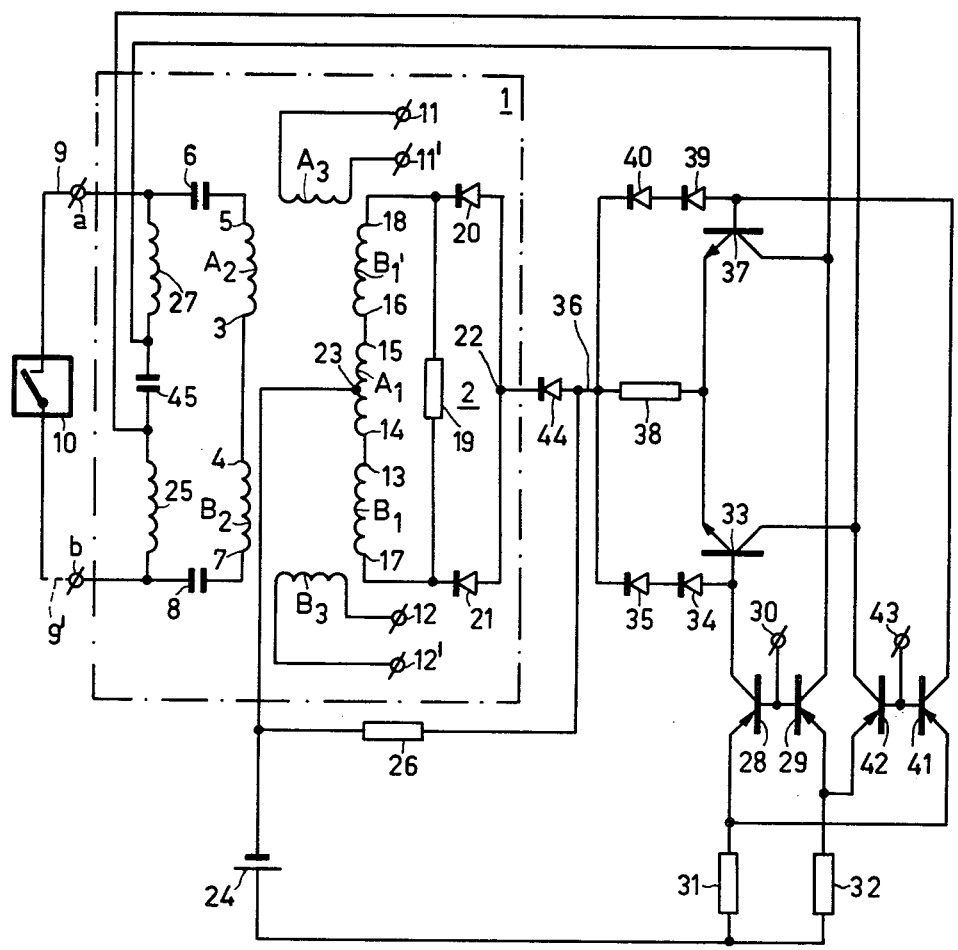

The invention will now be further explained with reference to the embodiments shown in the Figures, corresponding elements having being given the same reference symbols, wherein:

FIG. 1 shows a hybrid network for a two-wire line-four-wire circuit connection according to the invention, FIG. 2 shows a hybrid network for a two-wire line-four-wire connection provided with means for reversing the polarity of the subscriber's current.

FIG. 1 shows a self-adjusting hybrid network according to the invention. The hybrid network 1 comprises a first transformer having the windings $A_1$, $A_2$ and $A_3$ and a second transformer having the windings $B_1$, $B'_1$, $B_2$ and $B_3$, a balancing network 2 and an a.c./d.c. separation network consisting of the capacitors 6 and 8 and the chokes 25 and 27 and capacitor 45. Windings $A_2$ and $B_2$ together constitute the subscriber's winding. The winding $A_2$ is arranged in series with winding $B_2$ by connecting end 3 of winding $A_2$ to end 4 of winding $B_2$. The end 5 of winding $A_2$ is connected via a capacitor 6 to connecting terminal a of a set of terminals a, b, while end 7 of winding $B_2$ is connected to terminal b via a capacitor 8. A subscriber's line 9—9' (shown in Figure partly by means of dotted lines) having a subscriber's set 10 included therein is connected to the terminals a, b. Subscriber's set 10 is symbolically shown in the Figure by a switch-hook contact. The capacitors 6 and 8 decouple the subscriber's line winding $A_2$, $B_2$ from direct current to prevent the subscriber's direct current from premagnetizing the transformer core. The ends of winding $A_3$ are provided with terminals 11—11' for connecting a two-wire transmit line, while the ends of winding $B_3$ are provided with terminals 12—12' for connecting a two-wire receive line. The windings $B_1$, $A_1$ and $B'_1$ constitute the balancing winding and are arranged in series, end 13 of winding $B_1$ being connected to end 14 of winding $A_1$ and end 15 of winding $A_1$ being connected to end 16 of winding $B'_1$. The balancing network 2 comprises an impedance 19, shown in the Figure as a resistor, which is arranged in parallel with the windings $B_1$, $A_1$ and $B'_1$ and connected to end 17 of winding $B_1$ and end 18 of winding $B'_1$. In addition, the balancing network 2 comprises a first semi-conductor junction 20, shown in the Figure as a diode, connected to end 18 of winding $B'_1$, and to a first control terminal 22 and a second semi-conductor junction 21, shown in the Figure as a diode, connected to end 17 of winding $B_1$ and to the first control terminal 22. A second control terminal 23, located at the center tap of winding $A_1$ is connected to the negative terminal of a supply source 24. The positive terminal of the supply source 24 is coupled to connecting terminal b through a choke 25. The first control terminal 22 is coupled to the negative terminal of supply source 24 via a resistor 26 and to terminal a via a choke 27. The capacitor 45 is included in series with choke 25 and choke 27.

The embodiment according to the invention, shown in FIG. 1 operates as follows. Two situations may occur, namely loop is open or the subscriber has lifted the receiver from the hook i.e. the subscriber's line is closed by means of the switch-hook contact. For the closed loop case it will be assumed that a connection is setup between a first subscriber connected to the terminals a, b via the two-wire subscriber's line 9—9' and a second subscriber coupled to the terminals 11—11' and 12—12' of the four-wire circuit.

In the case of an open loop (switch-hook contact in subscriber's set 10 is open) no subscriber's current will flow so that diodes 20 and 21 are also inactive. The impedance of the balancing network is constituted by impedance 19. If the winding ratio of windings $A_2$, $B_2$ and windings $A_1$, $B_1$ and $B'_1$ is 10:1, the impedance 19, will have to be a 6Ω resistor, when a resistance of 600Ω is required at the subscriber's side. Alternatively it is possible to incorporate this resistor, partly or completely, in the windings $A_1$, $B_1$ and $B'_1$.

When the loop is closed (switch-hook contact in subscriber's set 10 is closed) a direct current, supplied by the d.c. supply source, will flow from the positive terminal of the source to the negative terminal of the source via choke 25, subscriber's line 9—9', choke 27 and the parallel arrangement of resistor 26 and the balancing network 2 which has the balancing winding connected thereto. The magnitude of the direct current depends on the impedance of the subscriber's loop connected to the hybrid network. A portion of the current flowing through this loop is supplied to the diodes 20 and 21 via control terminal 22. By means of this current the differential resistance of each of the diodes is adjusted to a value which corresponds to the value of the flowing direct current. The resistor 26 which is arranged in parallel with the balancing network and is connected between control terminals 22 and 23, determines the magnitude of the current through the diodes. This current should be such that the drive range of the diode is utilized optimally. In addition, the maximum current through the control terminals 22 and 23 is limited by this resistor.

The direct currents through the diodes 20 and 21 will be equal, in the case of identical diodes, so that identical direct currents will flow, in the opposite sense, through the balancing windings. Consequently the voltage difference across impedance 19 is zero, in the case of identical diodes.

The impedance of the balancing network for a.c. (speech) signals is formed, when the loop is in the closed state, by the parallel arrangement of impedance 19 in parallel with the series arrangement of the differential resistance of the oppositely connected diodes 20 and 21.

The alternating current impedance of the balancing network may be varied over a wide range if the differential resistance of the diodes is chosen to be 2,5Ω at 10 mA, impedance 19 having a value of approximately 6Ω. The value of resistor 26 is approximately 120Ω. In this manner a simple adjustment of the balancing network has been achieved for closed loop. The use of the chokes 25 and 27 has the advantage of preventing the (direct current) adjustment of the balancing network from affecting the a.c. (speech) signals and, reversely, the a.c. (speech) signals are prevented from reaching the control terminals 22 and 23, where they might affect the direct current adjustment of the balancing network. A further advantage of this embodiment is that, owing to the symmetry of the balancing network relative to the control terminals, the direct current supplied to one half of the balancing winding via diode 20 is equal in magnitude to but of opposite sign to the direct current supplied to the other half of the balancing windings via diode 21. In this way magnetization of the transformer core is prevented. Furthermore the symmetry allows the alternating current impedance (impedance 19) for the open loop to be connected to the balancing winding without the occurence of direct current dissipation since the d.c. voltage across it is zero in this condition.

The hybrid network according to the invention can be used, if the subscriber's line is of a fixed length, for adjusting the balance in dependence on the line condition (open/closed loop). In that case the balancing network automatically adjusts itself to either one of the two possible values. In addition, the hybrid network according to the invention automatically adjusts the balancing network to give the required impedances under the open and closed loop conditions substantially irrespective of the length (i.e. the resistance) of the subscriber's line connected. Thus the network can be used to serve lines of different lengths.

The embodiment shown in FIG. 1 is based on the use of transformers. However, the essence of the invention can also be used in an electronic hybrid network.

The supply source 24 determines the polarity of the direct current in the subscriber's line. The pass direction of the diode 20 and 21 is in agreement therewith. The opposite polarity of the direct current in the subscriber's line is obtained by reversing the polarity of supply source 24. The diodes must then also be reversed in the hybrid network according to the invention. A direct current with a changed polarity is obtained by synchronously reversing the polarity of the supply source and the diodes.

In the embodiment shown in FIG. 1 the hybrid network according to the invention includes control terminals 22 and 23 coupled to the connecting terminals a, b of the subscriber's line 9, 9'. If the b-wire is connected to ground via choke 25, the positive terminal of the supply source can also be connected to ground, and coupling terminal a to control terminal 22 via choke 27 is sufficient.

The preferred embodiment shown in FIG. 1 comprises a symmetrical balancing network. However, an asymmetrical balancing network may alternatively be used.

The embodiment shown in FIG. 1 comprises a voltage source and is therefore suitable for adjusting the balance for both an open and a closed subscriber's line of a fixed length as well as for adjusting the balance for subscriber's lines of differing lengths. The embodiment shown in FIG. 2 comprises a d.c. current source 24 for feeding the subscriber's line. Consequently the balance can only be adjusted for a closed or an open subscriber's line.

The hybrid network shown in FIG. 2 comprises a circuit for reversing the polarity of the subscriber's current. This circuit comprises a first pair of pnp transistors 28 and 29 whose bases are interconnected and connected to the terminal 30. The emitter of control transistor 28 is connected to the positive terminal of the supply source 24 via a resistor 31 and the emitter of transistor 29 is also connected to the positive terminal of the supply source via a resistor 32. The collector of control transistor 28 is connected to the base of npn transistor 33 and diode 34. Diode 34 is arranged in the manner, shown in FIG. 2, in series with diode 35 and connected to connecting point 36. Transistor 33, the diodes 34 and 35 and resistor 38 form part of a first current source. The collector of pnp transistor 29 is connected to the collector of npn transistor 37 and the choke 27. The emitters of the transistors 33 and 37 are interconnected and connected to one terminal of resistor 38. The other terminal of resistor 38 is connected to connecting point 36. The base of transistor 37 is connected to connecting point 36 in the manner, shown in FIG. 2, via a series arrangement of two diodes 39 and 40. Transistor 37, the diodes 39 and 40 and resistor 38 form part of a second current source. The base of transistor 37 is also connected to the collector of a pnp control transistor 41 of a second pair of pnp transistors 41 and 42. The bases of transistors 41 and 42 are interconnected and connected to terminal 43. The emitter of control transistor 41 is connected to the emitter of transistor 28 and the emitter of transistor 42 to the emitter of transistor 29. The collector of transistor 42 is connected in the manner, shown in the Figure, to the collector of transistor 33 and choke 25. Resistor 26 is provided between the negative terminal of the supply source 24 and connecting point 36. In the manner, shown in FIG. 2, connecting point 36 is connected to the diodes 20 and 21 via a diode 44. Diode 44 increases the voltage drop across resistor 26 so that a higher value can be chosen for resistor 26.

The terminals 30 and 43 are connected to a central control device, not shown in the Figure, which, in a first state, adjusts the potential of terminal 30 to a relatively high value and the potential of terminal 43 to a relatively low value and, in a second complementary state, the potential of terminal 30 to a relatively low and the potential of terminal 43 to a relatively high value.

In the first state the voltage applied to terminal 30 exceeds the emitter potential of the transistors 28 and 29 and, at the same time, the voltage applied to terminal 43 is lower than the emitter potential of the transistors 41 and 42. The transistors 41 and 42 then conduct, the transistors 28 and 29 are cut-off. The transistor 37, which forms part of the second current source, also conducts because the collector of transistor 37, which is connected to the collector of the inhibiting transistor 29, has a higher potential than the base of transistor 37 which is connected to the, conducting, control transistor 41. The transistor 33, which is part of the first current source, is cut-off because the collector potential is lower than the base potential. The current distribution over the transistors 41 and 42 is determined by the value of the emitter resistors 31 and 32. Resistor 31 has a value of approximately 3 kΩ resistor 32 a value of approximately 10Ω, so that the current will predominantly flow through transistor 42.

So, in this first state, the subscriber's current is applied to the subscriber's line via resistor 32, transistor 42 and choke 25 and to the balancing network via choke 27, transistor 37, resistor 38 and diode 44. The subscriber's direct current is used in conjunction with diodes 20, 21 in the manner described for FIG. 1 to adjust the impedance of the balancing network.

For the first state the polarity of the current in the subscriber's line is the same as the polarity in Figure 1. The polarity may be reversed by switching the central control device over to the complementary state. In the second state then obtained, terminal 30 is fed with a voltage which is lower than the emitter potential of the transistors 28 and 29 and terminal 43 is fed with a voltage which exceeds the emitter potential of the transistors 41 and 42. The operation of the second state is similar to that of the first state with the exception that now transistors 28, 29 and 33 perform the function of transistors 41, 42 and 37 and vice versa.

In the second state the subscriber's direct current will now be applied to the subscriber's line via resistor 32, transistor 29 and choke 27 and to the balancing network via choke 25, transistor 33, resistor 38 and diode 44. The polarity of the current applied to the balancing network is not changed, the polarity of the subscriber's current is, on the contrary, the reverse of that occurring in the first state.

This enables in a simple manner a balance adjustment in dependence on the line condition of the subscriber's line. A further advantage of the embodiment according to the invention is that the polarity of the direct current flowing in the subscriber's line does not affect the adjusting of the balancing network.

The embodiment of FIG. 2 can also be made suitable for adjusting the balance when a subscriber's line of a length which differs from case to case is connected. To this end the resistors 31 and 32, included in the respective emitter lines of the transistors 28, 41 and 29, 42 are dimensioned so that the subscriber's current is adjusted, at the minimum subscriber's line length, to the maximum current of, for example, 50 mA. If a longer subscriber's line is connected, the current will have to decrease. Consequently, the transistors have been given a voltage source character so that the operation of the circuit is, basically, comparable to the embodiment shown in FIG. 1.

In the embodiments of FIG. 1 and FIG. 2 the adjustable portion of the balancing network is constituted by a diode. A semi-conductor junction of a transistor may alternatively be used. For adjusting the hybrid to the balanced condition for one of the two possible line conditions (open/closed) it is, alternatively, possible to utilize a discrete element, such as, for example, a relay to which impedance 19 is connected in the currentless state (open loop) and which may be replaced, or changed, by a second impedance in the current-carrying state.

What is claimed is:

1. A hybrid network for connecting a two-wire subscriber's line to a four-wire line comprising:
   a pair of terminals connected to said hybrid network,
   a d.c. supply source,
   a two-wire subscriber's line connectible to said pair of terminals,
   first means for coupling said subscriber line to said four-wire line,
   second means for coupling said source to said terminals for supplying said subscriber line with d.c. current,
   an adjustable balancing network having control inputs and an impedance whose value varies in dependence on the direct current supplied to said control inputs, and
   a third means for coupling said control inputs to said terminals and said d.c. supply source such that the direct current applied to said control inputs is proportional to the direct current supplied by said source to said subscriber's line when said subscriber's line is connected to said terminals, whereby said impedance of said balancing circut is adjusted to correspond to the impedance of said subscriber's line.

2. The network according to claim 1 wherein said third coupling means includes a choke coil to prevent a.c. signals on said subscriber's line from reaching said balancing network.

3. The network according to claim 2 or 1 wherein said balancing network includes a variable resistance formed by a semiconductor junction coupled to said control inputs, the value of said resistance varying in accordance with direct current flowing through said junction.

4. The network according to claim 3 wherein said control inputs of said balancing network is connected to a respective one of said terminals and a pair of said variable resistances formed by said semiconductor junctions, and wherein said first coupling means comprises a pair of transformers for connecting said subscriber's line to a respective pair of wires of said four-wire line, said transformers each having a winding one end of which is connected by one of said junctions to one of said control inputs and the other end of which is connected by the other of said junctions to the other of said control inputs, one of said windings further having a center tap coupled to said source.

5. The network according to claim 4 including a further impedance connected in parallel with said windings.

6. The network according to claim 1 including means for reversing the polarity of the direct current supplied to said terminals whereby said balancing network operates in response to either polarity.

* * * * *